United States Patent
Oishi et al.

(10) Patent No.: US 8,661,686 B2
(45) Date of Patent: Mar. 4, 2014

(54) METHOD OF MANUFACTURING A SHELL TYPE NEEDLE ROLLER BEARING INCLUDING DRAWING AND IRONING OPERATIONS

(75) Inventors: Shinji Oishi, Iwata (JP); Masatoshi Niina, Iwata (JP)

(73) Assignee: NTN Corporation, Osaka (JP)

( * ) Notice: Subject to any disclaimer, the term of this patent is extended or adjusted under 35 U.S.C. 154(b) by 121 days.

(21) Appl. No.: 12/453,371

(22) Filed: May 8, 2009

(65) Prior Publication Data

US 2009/0218457 A1    Sep. 3, 2009

Related U.S. Application Data (63) Continuation of application No. 10/571,613, filed as application No. PCT/JP2004/013424 on Sep. 15, 2004, now abandoned.

(30) Foreign Application Priority Data

| Sep. 16, 2003 | (JP) | 2003-323240 |
|---|---|---|
| Sep. 16, 2003 | (JP) | 2003-323259 |
| Sep. 16, 2003 | (JP) | 2003-323278 |
| Sep. 24, 2003 | (JP) | 2003-331855 |
| Sep. 29, 2003 | (JP) | 2003-336878 |

(51) Int. Cl.
    *B21D 53/10*    (2006.01)
    *B21C 9/00*    (2006.01)

(52) U.S. Cl.
    USPC ............. 29/898.066; 29/898.13; 29/898.042; 29/898.06; 384/569; 384/572; 148/659; 72/349

(58) Field of Classification Search
    USPC ........... 29/898.42, 898.06, 898.061, 898.062, 29/898.064, 898.066, 898.067, 898.13, 29/898.14; 384/569, 572, 573; 148/659; 72/348, 349, 350
    See application file for complete search history.

(56) References Cited

U.S. PATENT DOCUMENTS

| 1,645,866 | A | * | 10/1927 | Lothrop | 29/898.067 |
|---|---|---|---|---|---|
| 1,736,959 | A | * | 11/1929 | Gibbons | 29/898.062 |

(Continued)

FOREIGN PATENT DOCUMENTS

| EP | 17434 | 10/1980 |
|---|---|---|
| EP | 714714 | 6/1996 |

(Continued)

OTHER PUBLICATIONS

Office Action issued Feb. 10, 2009 in U.S. Appl. No. 10/571,613.

(Continued)

*Primary Examiner* — David Bryant
*Assistant Examiner* — Jason L Vaughan
(74) *Attorney, Agent, or Firm* — Wenderoth, Lind & Ponack, L.L.P.

(57) ABSTRACT

A shell type outer ring 2 of a shell type needle roller bearing 1 is formed by a pressing combined with an ironing step, and the lubricating conditions in this ironing step on the outer-diameter ironed surface, which becomes the outer-diameter surface of the outer ring 2, are in a substantially fluid lubricating state so as to restrict the circumferential surface roughness of the inner-diameter surface, the inner-diameter roundness, and the amount of uneven thickness of the tubular portion to predetermined value ranges, thereby prolonging the life of the shell type needle roller bearing and lowering the acoustic level during use.

11 Claims, 9 Drawing Sheets

(56) References Cited

U.S. PATENT DOCUMENTS

| | | | | |
|---|---|---|---|---|
| 1,803,966 A * | 5/1931 | Gibbons | | 384/564 |
| 1,930,131 A * | 10/1933 | Padgett | | 29/898.062 |
| 1,985,693 A * | 12/1934 | Robinson | | 384/584 |
| 2,038,474 A * | 4/1936 | Brown | | 384/559 |
| 2,038,475 A * | 4/1936 | Brown | | 384/559 |
| 2,102,460 A * | 12/1937 | Heim | | 29/898.063 |
| 2,160,382 A * | 5/1939 | Heim | | 29/898.063 |
| 2,236,481 A * | 3/1941 | Storz | | 384/462 |
| 2,268,745 A * | 1/1942 | Frauenthal et al. | | 384/561 |
| 2,301,399 A * | 11/1942 | Heim | | 384/564 |
| 2,312,615 A * | 3/1943 | Allen | | 206/318 |
| 2,383,727 A * | 8/1945 | Lewis | | 384/559 |
| 2,567,242 A * | 9/1951 | Smith | | 384/564 |
| RE24,017 E * | 6/1955 | Henrick | | 428/470 |
| 2,772,470 A * | 12/1956 | Lyon | | 86/19.5 |
| 2,821,156 A * | 1/1958 | Lyon | | 72/43 |
| 2,875,511 A * | 3/1959 | Hawes | | 428/579 |
| 2,894,791 A * | 7/1959 | White et al. | | 384/564 |
| 2,961,357 A * | 11/1960 | Earnhardt et al. | | 29/421.2 |
| 2,983,030 A * | 5/1961 | Spicacci | | 29/898.066 |
| 3,006,703 A * | 10/1961 | Bensch | | 384/564 |
| 3,029,507 A * | 4/1962 | Gaggini | | 72/254 |
| 3,046,064 A * | 7/1962 | Schaeffler | | 384/572 |
| 3,199,173 A * | 8/1965 | Lefevre | | 29/898.054 |
| 3,248,155 A * | 4/1966 | Schaeffler | | 384/564 |
| 3,253,869 A * | 5/1966 | Smith | | 384/564 |
| 3,284,145 A * | 11/1966 | Bixby | | 384/484 |
| 3,348,889 A * | 10/1967 | Schaeffler et al. | | 384/484 |
| 3,360,157 A * | 12/1967 | Bolt et al. | | 220/62.17 |
| 3,378,903 A * | 4/1968 | Cardillo | | 29/898.066 |
| 3,399,004 A * | 8/1968 | Rohde et al. | | 384/127 |
| 3,423,140 A * | 1/1969 | Cowles | | 384/486 |
| 3,434,322 A * | 3/1969 | Cowles et al. | | 72/107 |
| 3,539,232 A * | 11/1970 | Batt | | 384/473 |
| 3,558,200 A * | 1/1971 | Barr | | 384/464 |
| 3,577,753 A * | 5/1971 | Shah et al. | | 72/41 |
| 3,624,881 A * | 12/1971 | Brown | | 419/8 |
| 3,653,249 A * | 4/1972 | Dunn | | 72/349 |
| 3,670,543 A * | 6/1972 | Bolt et al. | | 72/41 |
| 3,677,032 A * | 7/1972 | Suzuki | | 464/128 |
| 3,700,299 A * | 10/1972 | Batt | | 384/564 |
| 3,784,268 A * | 1/1974 | De Gioia et al. | | 384/478 |
| 3,826,123 A * | 7/1974 | Hasselbeck | | 72/349 |
| 3,924,437 A * | 12/1975 | Hortig | | 72/349 |
| 3,943,740 A * | 3/1976 | Bartenstein | | 72/45 |
| 3,945,231 A * | 3/1976 | Imazu et al. | | 72/45 |
| 3,972,217 A * | 8/1976 | Misonoo | | 72/344 |
| 4,022,042 A * | 5/1977 | Linz et al. | | 72/62 |
| 4,040,282 A * | 8/1977 | Saunders | | 72/41 |
| 4,109,502 A * | 8/1978 | Schaffer | | 72/349 |
| 4,148,208 A * | 4/1979 | Maeder | | 72/342.4 |
| 4,183,237 A * | 1/1980 | Schaffer | | 72/349 |
| 4,193,279 A * | 3/1980 | Maeder | | 72/44 |
| 4,223,544 A * | 9/1980 | Main | | 72/45 |
| 4,262,512 A * | 4/1981 | Maeder | | 72/45 |
| 4,300,375 A * | 11/1981 | Maeder et al. | | 72/45 |
| 4,346,580 A * | 8/1982 | Saunders | | 72/344 |
| 4,407,149 A * | 10/1983 | Smith et al. | | 72/47 |
| 4,437,214 A * | 3/1984 | Olschewski et al. | | 29/898.066 |
| 4,441,239 A * | 4/1984 | Mullen | | 29/898.061 |
| 4,441,354 A * | 4/1984 | Bodega | | 72/342.1 |
| 4,442,692 A * | 4/1984 | Lyu | | 72/349 |
| 4,457,150 A * | 7/1984 | Saunders et al. | | 72/47 |
| 4,472,955 A | 9/1984 | Nakamura et al. | | |
| 4,522,514 A * | 6/1985 | Olschewski et al. | | 384/569 |
| 4,523,362 A * | 6/1985 | Cuozzo et al. | | 29/898.063 |
| 4,534,201 A * | 8/1985 | LaRosa et al. | | 72/348 |
| 4,554,815 A * | 11/1985 | Weishalla | | 72/349 |
| 4,581,079 A * | 4/1986 | Borik | | 148/653 |
| 4,657,685 A * | 4/1987 | Uematsu et al. | | 508/306 |
| 4,881,394 A * | 11/1989 | Jansen | | 72/45 |
| 4,887,918 A * | 12/1989 | Kawachi | | 384/560 |
| 4,893,387 A * | 1/1990 | Akamatsu et al. | | 492/37 |
| 4,955,732 A * | 9/1990 | Behrens | | 384/484 |
| 4,977,606 A | 12/1990 | Budecker | | |
| 4,998,346 A * | 3/1991 | Behrens | | 29/898.061 |
| 4,999,913 A | 3/1991 | Kawachi | | |
| 5,014,536 A * | 5/1991 | Saunders | | 72/349 |
| 5,035,051 A * | 7/1991 | Iijima | | 29/898.054 |
| 5,044,788 A * | 9/1991 | Murphy et al. | | 384/577 |
| 5,064,298 A * | 11/1991 | Hibi et al. | | 384/625 |
| 5,105,645 A * | 4/1992 | Kobayashi et al. | | 72/348 |
| 5,168,742 A * | 12/1992 | Heyes et al. | | 72/379.4 |
| 5,179,854 A * | 1/1993 | Matsui et al. | | 72/349 |
| 5,287,713 A * | 2/1994 | Mine et al. | | 72/43 |
| 5,290,374 A * | 3/1994 | Holtz et al. | | 148/559 |
| 5,385,413 A * | 1/1995 | Murphy et al. | | 384/564 |
| 5,397,188 A * | 3/1995 | Yoshizuka et al. | | 384/492 |
| 5,409,130 A | 4/1995 | Saunders | | |
| 5,456,538 A | 10/1995 | Honda et al. | | |
| 5,529,402 A * | 6/1996 | Murphy | | 384/564 |
| 5,555,761 A * | 9/1996 | Lavy | | 72/349 |
| 5,578,878 A | 11/1996 | Hall | | |
| 5,632,171 A * | 5/1997 | Kunka et al. | | 72/43 |
| 5,641,038 A * | 6/1997 | Akamatsu | | 184/6.17 |
| 5,642,988 A | 7/1997 | Zorn | | |
| 5,692,409 A * | 12/1997 | Cheers et al. | | 72/349 |
| 5,705,124 A * | 1/1998 | Ochi et al. | | 420/105 |
| 5,787,752 A * | 8/1998 | Iwase et al. | | 72/349 |
| 5,842,835 A | 12/1998 | Kawaguchi et al. | | |
| 5,845,394 A * | 12/1998 | Abe et al. | | 29/897.2 |
| 5,848,846 A * | 12/1998 | Sugiyama et al. | | 384/625 |
| 5,878,496 A * | 3/1999 | Liu et al. | | 29/898.066 |
| 5,987,951 A * | 11/1999 | Saunders | | 72/69 |
| 6,051,082 A * | 4/2000 | Okita et al. | | 148/333 |
| 6,176,623 B1 * | 1/2001 | Zeigler | | 384/559 |
| 6,194,357 B1 * | 2/2001 | Murata et al. | | 508/113 |
| 6,328,477 B1 * | 12/2001 | Tsujimoto et al. | | 384/450 |
| 6,419,398 B1 * | 7/2002 | Murphy et al. | | 384/569 |
| 6,524,009 B1 * | 2/2003 | Kurimura et al. | | 384/491 |
| 6,586,907 B1 * | 7/2003 | Mori et al. | | 320/107 |
| 6,620,262 B1 * | 9/2003 | Okita et al. | | 148/226 |
| 6,673,171 B2 * | 1/2004 | Hlady et al. | | 148/603 |
| 7,082,805 B2 | 8/2006 | Ezaka et al. | | |
| 7,147,730 B2 * | 12/2006 | Nakamura et al. | | 148/541 |
| 7,374,019 B2 * | 5/2008 | Kosugi et al. | | 184/6.14 |
| 7,416,346 B2 * | 8/2008 | Takemura et al. | | 384/564 |
| 2002/0019321 A1 * | 2/2002 | Balliett | | 508/246 |
| 2003/0215169 A1 | 11/2003 | Yajima | | |

FOREIGN PATENT DOCUMENTS

| | | | | |
|---|---|---|---|---|
| EP | 715908 | 6/1996 | | |
| EP | 1286402 | 2/2003 | | |
| GB | 2074611 | 11/1981 | | |
| JP | 54-52669 | 4/1979 | | |
| JP | 58-181431 | 10/1983 | | |
| JP | 62-266224 | 11/1987 | | |
| JP | 4-231722 | 8/1992 | | |
| JP | 7-042743 | 2/1995 | | |
| JP | 07-108340 | 4/1995 | | |
| JP | 7-119748 | 5/1995 | | |
| JP | 8-182254 | 7/1996 | | |
| JP | 09316540 A * | 12/1997 | | C21D 9/32 |
| JP | 11-6521 | 1/1999 | | |
| JP | 11-140543 | 5/1999 | | |
| JP | 2997047 | 10/1999 | | |
| JP | 11-351145 | 12/1999 | | |
| JP | 2000-120730 | 4/2000 | | |
| JP | 2000-170755 | 6/2000 | | |
| JP | 3073937 | 6/2000 | | |
| JP | 2001-50262 | 2/2001 | | |
| JP | 2001-124092 | 5/2001 | | |
| JP | 2001-187915 | 7/2001 | | |
| JP | 2002-031212 | 1/2002 | | |
| JP | 2002-295485 | 10/2002 | | |
| JP | 2002-327238 | 11/2002 | | |
| JP | 2003-004051 | 1/2003 | | |

(56) References Cited

FOREIGN PATENT DOCUMENTS

| | | |
|---|---|---|
| JP | 2003-161325 | 6/2003 |
| JP | 2003-202016 | 7/2003 |
| JP | 2003-222226 | 8/2003 |

OTHER PUBLICATIONS

Japanese Notice of Reasons for Rejection (with English Abridged Translation) in Japanese Application No. 2003-323240.

Japanese Notice of Reasons for Rejection (with English Abridged Translation) in Japanese Application No. 2003-331855.

Japanese Decision to Grant a Patent (and partial English translation) issued Nov. 27, 2009 in Japanese Application No. 2009-253162.

Japanese Encyclopedia passage regarding "Fluid Lubrication and Boundary Lubrication" (with partial English translation), from World Great Encyclopedia 11, Heibonsha Limited, Norimune Sota, 1967, pp. 249-250.

Japanese Explanation (with partial English translation) of Japanese Application No. 2009-253162, which was submitted to the JPO on Nov. 13, 2009.

European Office Action issued Jul. 18, 2012 in counterpart European Patent Application No. 04 733 087.4.

\* cited by examiner

METHOD OF MANUFACTURING A SHELL TYPE NEEDLE ROLLER BEARING INCLUDING DRAWING AND IRONING OPERATIONS

This is a continuation application of U.S. patent application Ser. No. 10/571,613, filed Mar. 10, 2006, which is the National Stage of International Application No. PCT/JP2004/013424, filed Sep. 15, 2004.

TECHNICAL FIELD

This invention relates to a shell type needle roller bearing, a support structure for a compressor spindle, and a support structure for a piston pump driving portion.

BACKGROUND ART

Among needle roller bearings, in which a plurality of needle rollers are arranged along the inner-diameter surface of the outer ring, there are ones using a shell type outer ring formed by pressing including a drawing step. Applications of shell type needle bearings using such a shell type outer ring range extensively because of their economical advantages. Recently, applications in which long lives are required are increasing.

Schematic steps of pressing of a conventional shell type outer ring are as follows. First, a circular blank is formed into a cup shape in a drawing step, and the corner portion of the cup bottom is restruck to a predetermined corner radius in a restriking step. Thereafter, the central portion of the cup bottom is punched in a bottom punching step to form one of the flanges of the outer ring, and the top end portion of the cup is trimmed to a uniform height in a trimming step. After the drawing or restriking step, an ironing step may be added. Ordinarily, such pressing is carried out using a transfer press or a progressive press. If a transfer press is used, a punching step of a circular blank is often incorporated together. The other flange of the outer ring is formed by bending the top end of the cup inwardly in an assembling step after heat treatment.

For the blank material for such a shell type outer ring, a steel plate of a casehardened steel such as SCM415 is used. In order to ensure predetermined product strength, it is subjected to heat treatment such as carburizing/hardening or annealing after pressing. Since a steel plate of a casehardened steel is high in the carbon content compared with a soft steel plate such as SPCC and thus the r value, which is a standard for drawing properties, is low, the number of drawings in the drawing step is divided into a plurality of times to set the drawing ratio per drawing small.

As described, since a shell type outer ring is formed through many pressing steps, due to accumulation of precision errors of molds and uneven strains in each working steps, it is inferior to an outer ring formed by cutting in the roundness of the tubular portion and the dimensional accuracy of the amount of uneven thickness, so that the life of the bearing is short. As one in which heat treatment of a shell type outer ring is carried out after the assembling of the bearing, and in which the outer ring is further hardened and tempered after carburizing/nitriding in order to improve the life of such a shell type needle roller bearing, there is a manufacturing method of a shell-type needle roller bearing in which the outer-diameter roundness of the outer ring is increased and the strength of each bearing part is increased (For example, see JP patent publication 3073937, pages 1-2, FIGS. 1-3).

On the other hand, among compressors for e.g. air-conditioners, there are ones using a support structure in which compression action members are actuated by driving the spindle, and radial loads on the spindle are supported by a needle roller bearing arranged in the compressor (For example, see JP patent publication 2997047, page 2, FIGS. 10-12). A needle roller bearing has an advantage that in spite of the fact that the projected area is small, a high load capacity and a high rigidity can be obtained. Thus, a support structure for a compressor spindle can be designed compact.

In a needle roller bearing employed for such a support structure for a compressor spindle, since a lubricating state tends to be thin due to mixing of a coolant, and also, the spindle rotates at a high speed, surface damage such as smearing or surface starting type peeling may develop on the inner-diameter surface of the outer ring, on which the needle rollers roll, thus shortening the bearing life. Also, in a compressor for a vehicle air-conditioner, it is required to reduce noise during use of the bearing due to the rolling of the needle rollers.

Also, in an automatic brake system such as an anti-lock brake system (ABS) or traction control (TRC), a piston pump for feeding brake fluid in a reservoir tank into a master cylinder is provided. Among piston pumps for feeding oil or the like under pressure, there are ones in which an eccentric portion is provided on an armature shaft which is the output shaft of the electric motor, and the reciprocated piston is abutment-supported by a rolling bearing fitted on the eccentric portion (For example, see JP patent publication 8-182254, page 2 and FIG. 7). There are also ones in which a needle roller bearing is employed for a rolling bearing for abutment-supporting such a piston (For example, see JP patent publication 2001-187915, page 2 and FIG. 9).

In a needle roller bearing employed in a support structure of the piston pump driving portion, since the lubricating state becomes thin due e.g. to mixing of low-viscosity oil (brake fluid), and also, the needle rollers roll at a high speed on the inner-diameter surface of the outer ring, which the piston abuts, a runout of oil film tends to occur on this rolling surface. Thus, surface damage such as smearing or surface-starting type peeling may occur on the inner-diameter surface of the outer ring, thus shortening the bearing life. In a piston pump mounted in a vehicle brake system such as ABS or TRC, too, it is required to reduce the noise during use of the bearing due to the rolling of the needle rollers.

SUMMARY OF THE INVENTION

Problems to be Solved by the Invention

While the manufacturing method of a shell type needle roller bearing described in JP patent publication 3073937 can increase the outer-diameter roundness by reducing thermal strains of the shell type outer ring by carrying out heat treatment after assembling the bearing, since the pressing step of the shell type outer ring is the same as before, the inner-diameter roundness and the amount of uneven thickness of the tubular portion scarcely improve. For reference, the inner-diameter roundness of a conventional shell type outer ring is 15-40 μm for one having an inner diameter of about 25 mm. Even for the one made by the manufacturing method described in JP patent publication 3073937, it exceeds 10 μm. Also, the amount of uneven thickness of the tubular portion is 10-20 μm for one having an inner diameter of about 25 mm even for one made by the manufacturing method described in JP patent publication 3073937.

Thus, in a shell type needle roller bearing used for a support structure for a spindle of a compressor for e.g. air-conditioners or a piston pump driving portion, in which use conditions including lubrication are extremely harsh, even for one made by the manufacturing method described in JP patent publication 3073937, no sufficiently satisfactory long life has been achieved.

Also, for a shell type outer ring formed by pressing, the surface roughness of the inner-diameter surface is rougher than an outer ring formed by cutting. Ordinarily, the surface roughness of an outer ring formed by cutting is about Ra 0.05 μm, while the surface roughness of the inner-diameter surface of a shell type outer ring is about Ra 0.4 μm. Thus, in a conventional shell type needle roller bearing, sounds during use due to the rolling of the needle rollers on the inner-diameter surface are large, so that it cannot be applied to a support structure for a compressor spindle of a vehicle air-conditioner or a support structure for a driving portion of a piston pump mounted in a vehicle brake system such as ABS or TRC, which severely hates production of noise.

Therefore, an object of this invention is to prolong the life of a shell type needle roller bearing used for a support structure for a compressor spindle, a support structure for a piston pump driving portion, or the like, and to reduce the acoustic level during use.

Means for Solving the Problems

In order to solve the above object, this invention provides a shell type needle roller bearing wherein a plurality of needle rollers are arranged along the inner-diameter surface of a shell type outer ring formed by pressing, characterized in that the surface roughness of the inner-diameter surface of the outer ring is finer than the surface roughness of the outer-diameter surface.

That is to say, by making the surface roughness of the inner-diameter surface of the shell type outer ring finer than the outer-diameter surface, it is possible to reduce the acoustic level during use due to rolling of the needle rollers on the inner-diameter surface.

The circumferential surface roughness of the outer ring inner-diameter surface is preferably Ra 0.05-0.3 μm. The reason why the lower limit of the circumferential surface roughness is set at Ra 0.05 μm is because if the circumferential surface roughness is finer than this, and the inner-diameter surface is too smooth, lubricating oil retained in an elastic contact area of the rolling needle rollers decreases, so that surface damage such as smearing tends to develop. The upper limit of the circumferential surface roughness is set at Ra 0.3 μm for the following reasons.

Figure 4:
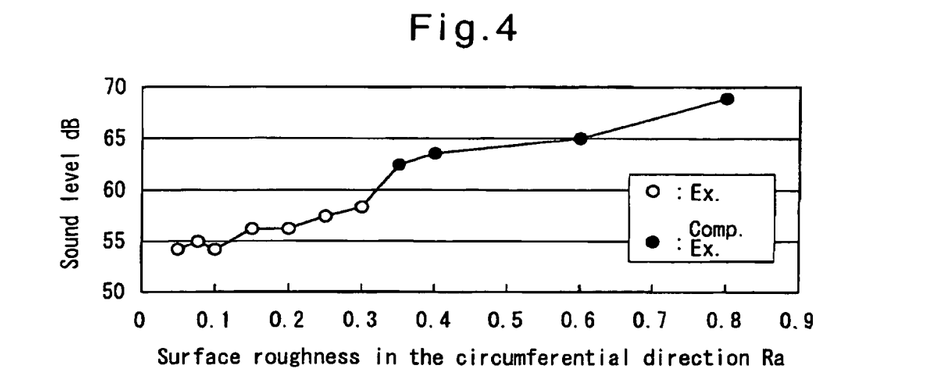
FIG. 4 is a graph showing the relation between the circumferential surface roughness of the inner-diameter of the outer ring and the acoustic level in an acoustic measurement test of shell type needle roller bearings.

The present inventors conducted acoustic measurement tests using a rotary tester for shell type needle roller bearings that are different in the surface roughness of the inner-diameter surface of the shell type outer ring, discovered that when the circumferential surface roughness on the inner-diameter surface is made fine, the acoustic level of the bearing is reduced effectively, and confirmed that the acoustic level can be reduced markedly if it is set at Ra 0.3 μm or less as shown in FIG. 4.

The reason why the circumferential surface roughness of the inner-diameter surface is especially effective in reducing the acoustic level is considered as follows. That is to say, if the projections and recesses in the rotational direction of the rollers (circumferential surface roughness) becomes rough to a certain extent or over relative to the roller diameter of the needle rollers, vertical vibrations of the needle rollers increase, so that large sounds are produced. Since the roller diameter of the needle rollers is relatively small, if the circumferential surface roughness exceeds Ra 0.3 μm, it is considered that large sounds are produced.

The axial surface roughness of the outer ring inner-diameter surface is preferably Ra 0.3 μm or less. Needle rollers are large in the roller length compared to the roller diameter. Thus, recesses and projections in the width direction of the outer ring inner-diameter surface (axial surface roughness) also have an influence on vertical vibrations. Thus, if the axial surface roughness exceeds Ra 0.3 μm, it is considered that sounds increase.

This invention also provides a shell type needle roller bearing wherein a plurality of needle rollers are arranged along the inner-diameter surface of a shell type outer ring formed by pressing, characterized in that the inner-diameter roundness of the outer ring is not more than 10 μm.

Figure 5:
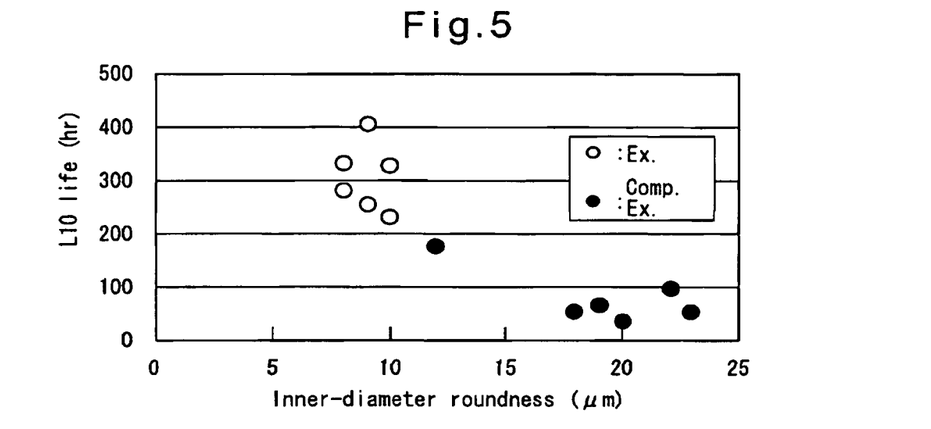
FIG. 5 is a graph showing the relation between the inner-diameter roundness of the shell type outer ring and the L10 life in a bearing life test of shell type needle roller bearings.

The present inventors conducted bearing life tests for shell type needle roller bearings that are different in the inner-diameter roundness of the shell type outer ring, and confirmed that as shown in FIG. 5, the inner-diameter roundness and the bearing life have good correlation and that a sufficiently long life is achievable by determining the inner-diameter roundness at 10 μm or less even in harsh conditions required in the future.

Further, this invention provides a shell type needle roller bearing wherein a plurality of needle rollers are arranged along the inner-diameter surface of a shell type outer ring formed by pressing, characterized in that the amount of uneven thickness of the tubular portion of the outer ring is less than 10 μm.

Figure 6:
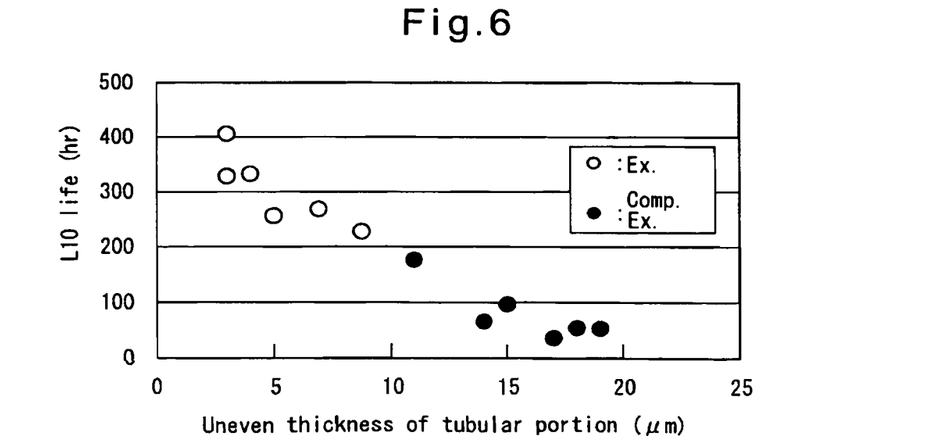
FIG. 6 is a graph showing the relation between the amount of uneven thickness of the tubular portion of the shell type outer ring and the L10 life in a bearing life test of shell type needle roller bearings.

The present inventors conducted bearing life tests for shell type needle roller bearings that are different in the amount of uneven thickness of the tubular portion of the shell type outer ring, and confirmed that as shown in FIG. 6, the amount of uneven thickness of the tubular portion of the outer ring and the bearing life have good correlation and that a sufficiently long life is achievable by determining the amount of axial uneven thickness at less than 10 μm even under harsh use conditions.

It is considered that the reason why the inner-diameter roundness of the shell type outer ring or lowering of the amount of uneven thickness of the tubular portion has an effect on the prolonged life of the bearing is because the rolling of the needle rollers on the inner-diameter surface becomes smooth, so that local wear and stress concentration on the inner-diameter surface due to slipping, shaking or the like of the rollers are suppressed.

Means for making the surface roughness of the inner-diameter surface of the outer ring finer than the surface roughness of the outer-diameter surface, means for making the inner-diameter roundness of the outer ring less than 10 μm, or means for making the amount of uneven thickness of the tubular portion of the outer ring less than 10 μm may be one in which an ironing step is provided in the pressing for forming the shell type outer ring, and the lubricating conditions on the outer-diameter side ironing surface which becomes the outer-diameter surface of the outer ring in the ironing step are a substantially fluid lubricating state.

The present inventors conducted a drawing/ironing test of an SCM415 steel plate using a press tester to examine the surface roughness of the inner- and outer-diameter surfaces, the inner-diameter roundness, and the amount of uneven thickness of the tubular portion. As a result, it was found out that if a high-viscosity pressing oil superior in lubricity is applied to the die side (outer-diameter ironed surface of the cup-shaped article), the surface roughness of the inner-diameter surface of the cup-shaped article, which becomes the radially inner surface of the shell type outer ring, becomes finer than the outer-diameter surface, and that the inner-diameter roundness and the amount of uneven thickness of the tubular portion improve.

Figure 11:
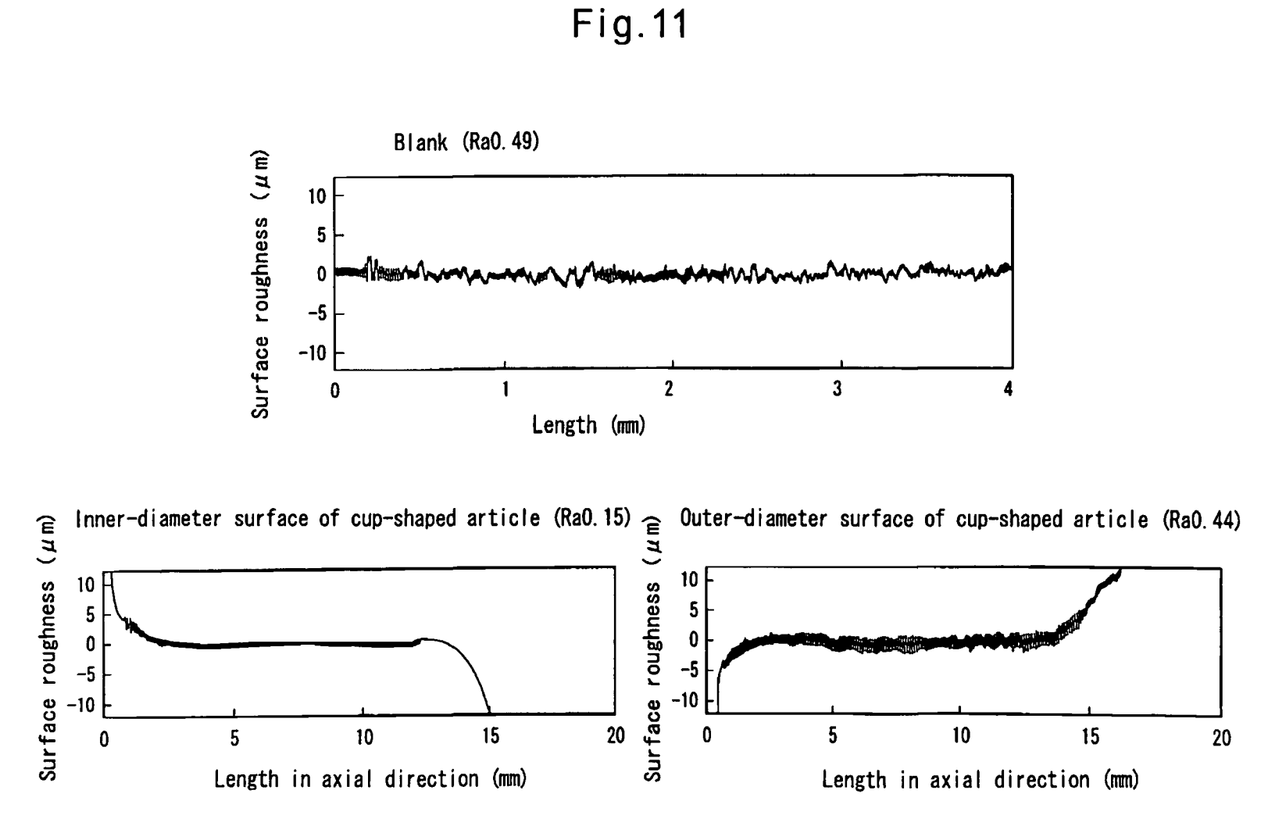
FIG. 11 includes graphs showing the surface roughnesses of the inner- and outer-diameter surfaces of cup-shaped articles and the surface roughness of blank materials in a drawing/ironing test.

First, for the examination results of the surface roughness, one example thereof is shown in FIG. 11. While the surface roughness of the blank material was about Ra 0.49 µm both on front and back, the surface roughness of the inner-diameter surface of the cup-shaped article was extremely fine, i.e. Ra 0.15 µm. The surface roughness of the outer-diameter surface of the cup-shaped article was Ra 0.44 µm, which is not substantially different from the surface roughness of the blank material. The surface roughness of either of the inner- and outer-diameter surfaces of the cup-shaped article shown in FIG. 11 was measured in the axial direction. But the surface roughnesses measured in the circumferential direction were also substantially equal to them. These measurement results are opposite to those observed in normal drawing/ironing. In normal drawing/ironing, the outer-diameter surface of the cup-shaped article, which is ironed by a die, has a finer surface roughness, while the surface roughness of the inner-diameter surface was not substantially different from the surface roughness of the blank material.

These examination results are considered as follows. That is, it is considered that the reason why the surface roughness of the outer-diameter surface of the cup-shaped article was not substantially different from the surface roughness of the material is because the outer-diameter ironed surface of the cup-shaped article was in a substantially fluid lubricated state in which the material to be worked scarcely contacts the die. By making the lubricating conditions on the die side in a substantially fluid lubricated state, shearing force on the outer-diameter ironed surface due to friction with the die scarcely exists, so that stresses at the ironed portion between the punch and the die becomes a uniform compression stress state in the plate thickness direction. Thus, as evidenced in FIG. 12, the material is deformed so that its thickness decreases uniformly in the plate thickness direction.

Figure 12:
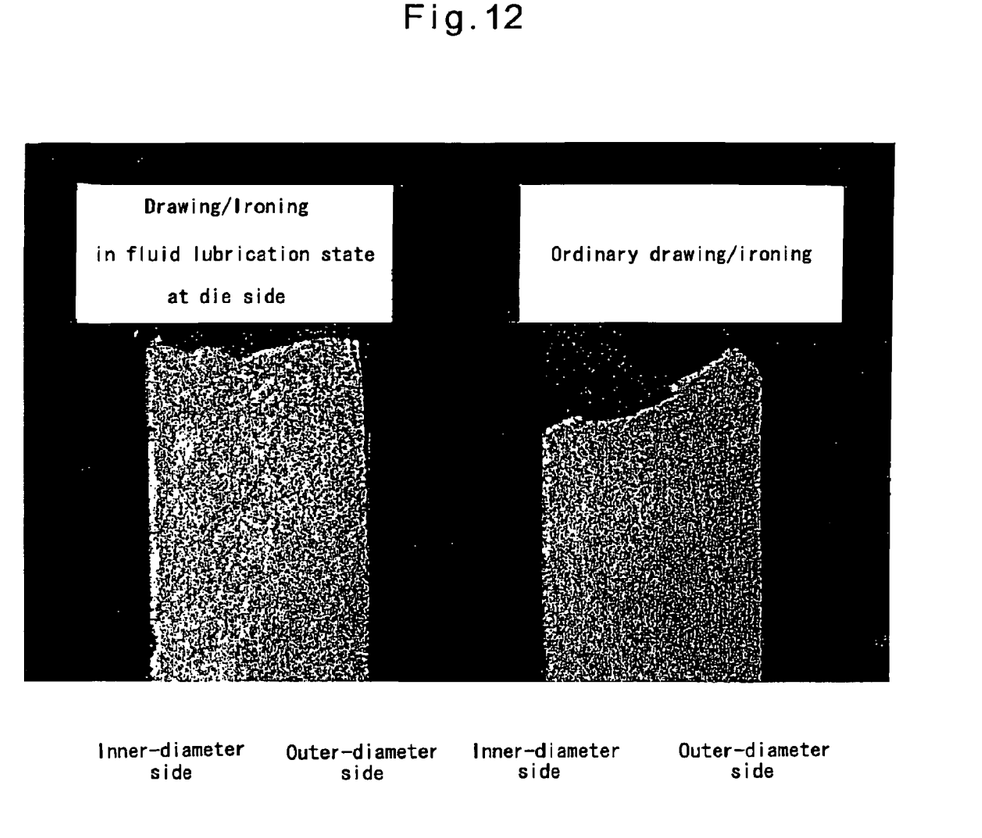
FIG. 12 includes plate thickness sectional photos of the top end portions of cup-shaped articles in a drawing/ironing test.

FIG. 12 shows a plate thickness sectional photo of the top end portion of the cup-shaped article. As though evidencing the above estimation, the top end portion of the cup-shaped article, to the die side of which is applied a pressing oil superior in lubricity, is axially uniformly stretched in the plate thickness direction. It is considered that when the material was deformed and axially stretched so that its thickness uniformly would decrease in the plate thickness direction, the inner-diameter surface of the cup-shaped article, which was in contact with the punch, axially moved along and relative to the surface of the punch, so that the surface roughness of the inner-diameter surface became fine due to sliding with the surface of the punch due to the relative movement. On the other hand, the top end portion of the cup-shaped article by normal drawing/ironing is extremely stretched in the axial direction on the outer-diameter side. This is because the outer-diameter side of the cup-shaped article is preferentially deformed so that its thickness decreases due to friction with the die, while the inner-diameter side is not very much deformed so that its thickness decreases. As described above, in normal drawing/ironing, in which the inner-diameter side is deformed little so that its thickness decreases, since the inner-diameter surface of the cup-shaped article scarcely moves relative to the surface of the punch, its surface roughness is not substantially different from that of the raw material.

In the working method in which the lubricating conditions on the outer-diameter drawn surface are in a substantially fluid lubricated state, as shown in FIG. 12, the top end face of the cup-shaped article becomes uniform in the plate thickness direction, so that it is also possible to improve the yield by reducing the blank diameter. By reducing the blank diameter, pressing loads necessary for drawing also decrease.

Next, for the inner-diameter roundness and the amount of uneven thickness of the tubular portion, as shown in Table 1, it was confirmed that the inner-diameter roundness decreased to 10 µm or less, and the amount of uneven thickness of the tubular portion to less than 10 µm. These examination results are considered as follows. That is, as described above, when the raw material is deformed so that its thickness decreases uniformly in the plate thickness direction with the lubricating conditions on the die side in a substantially fluid lubricating state, it is considered that the amount of uneven thickness of the tubular portion of the cup-shaped article decreases, and the inner-diameter surface of the cup-shaped article, which contacts the punch, axially moves along and relatively to the surface of the punch so as to conform to the shape of the outer-diameter surface of the punch, so that even after it has been released from the punch, the inner-diameter roundness of the cup-shaped article is favorably retained. On the other hand, in normal drawing/ironing, the inner-diameter side of the cup-shaped article is not so much deformed so that its thickness decreases, and scarcely moves relative to the surface of the punch, so that the inner-diameter roundness of the cup-shaped article and the amount of uneven thickness of the tubular portion do not improve so much.

With the arrangement in which the number of drawings in a drawing step in the pressing is not more than three times, and the drawing step is a drawing/ironing step carried out simultaneously with the final, the drawing step, it is possible to reduce the number of molds for pressing and the number of steps. Also, by reducing the number of drawings, lowering of the dimensional accuracy of the outer ring resulting from e.g. set errors of individual molds is suppressed.

In drawing/ironing, it is known that a larger drawing ratio is obtained than in simple drawing. That is, in drawing, the drawing limit is determined by breakage at the shoulder portion of the punch due to the deformation resistance of the shrinking flange and the tensile stress resulting from wrinkle suppressing force at the flange portion, whereas in drawing/ironing, since the tensile stress from the flange side that acts on the shoulder portion of the punch is shut off at the ironed portion, the drawing limit increases, so that a large drawing ratio is obtainable.

In the arrangement in which the number of drawings in the drawing step is one, and the ironing step is a drawing/ironing step carried out simultaneously with this one-time drawing step, it is possible to further promote reduction in the manufacturing cost and improvement in the dimensional accuracy of the outer ring.

Further, this invention provides a support structure for a spindle of a compressor in which a compression action member of the compressor is actuated by rotary-driving the spindle, and radial loads on the spindle are supported by a needle roller bearing arranged in the compressor, characterized in that the needle roller bearing is the above-described shell type needle roller bearing.

Further, this invention provides a support structure for a piston pump driving portion wherein the driving portion of the piston pump is abutment-supported by a needle roller bearing fitted on an eccentric portion of a motor output shaft, characterized in that the needle roller bearing is the above-described shell type needle roller bearing.

Effects of the Invention

In the shell type needle roller bearing of this invention, since the surface roughness of the inner-diameter surface of the shell type outer ring is finer than the outer-diameter surface, and its circumferential surface roughness is preferably Ra 0.05-0.3 μm, even though it is a low-cost shell type, it is possible to reduce the acoustic level during use of the bearing without generating surface damage such as smearing. Thus, it is possible to suitably use for applications which hate generation of noise.

Also, in the shell type needle roller bearing of this invention, since the inner-diameter roundness of the shell type outer ring is 10 μm or less, it is possible to substantially increase the bearing life and to achieve sufficiently satisfactory long life and low cost.

Further, in the shell type needle roller bearing of this invention, since the amount of uneven thickness of the tubular portion of the shell type outer ring is less than 10 μm, it is possible to substantially extend the bearing life and to achieve sufficiently satisfactory long life and low cost.

In an arrangement in which means for making the surface roughness of the inner-diameter surface of the outer ring finer than the surface roughness of the outer-diameter surface, means for making the inner-diameter roundness of the outer ring less than 10 μm, or means for making the amount of uneven thickness of the tubular portion of the outer ring less than 10 μm is one in which an ironing step is provided in the pressing for forming the shell type outer ring, and the lubricating conditions on the outer-diameter side ironing surface which becomes the outer-diameter surface of the outer ring in the ironing step are a substantially fluid lubricating state, since the top end face of the cup-shaped article becomes substantially uniform in the plate thickness direction, it is possible to improve the yield by reducing the blank diameter, and to lower pressing loads necessary for the drawing.

In an arrangement in which the number of drawings in a drawing step in the pressing is not more than three times, and the drawing step is a drawing/ironing step carried out simultaneously with the final, the drawing step, it is possible to reduce the manufacturing cost by reducing the number of molds for pressing and the number of steps. Also, by reducing the number of drawings, it is possible to suppress reduction in the dimensional accuracy of the outer ring resulting from setting errors of the molds or the like.

In an arrangement in which the number of drawings in the drawing step is one, and the ironing step is a drawing/ironing step carried out simultaneously with this one-time drawing step, it is possible to further promote lowering of the manufacturing cost and improvement in the dimensional accuracy of the outer ring.

For the support structure of a compressor spindle of this invention, as a needle roller bearing for supporting radial loads of the compressor spindle, one of the above-described shell type needle roller bearings is used, so that it is possible to reduce noise during operation of the compressor, and to prolong the life of the bearing portion.

Further, for the support structure of a piston pump driving portion, as a needle roller bearing for abutment-supporting the piston pump driving portion, one of the shell type needle roller bearings is used, so that it is possible to reduce the acoustic level during operation of the piston pump, and to prolong the life of the bearing portion.

| Explanation of reference numbers | |
|---|---|
| 1 | shell type needle roller bearing |
| 2 | shell type outer ring |
| 2a | inner-diameter surface |
| 3 | needle rollers |
| 4 | retainer |
| 5a, 5b | flange |
| 11 | spindle |
| 12 | oblique plate |
| 13 | shoes |
| 14 | piston |
| 14a | recess |
| 15 | housing |
| 16 | thrust needle roller bearing |
| 17 | cylinder bores |
| 18 | spherical seats |
| 21 | spindle |
| 22 | coupling member |
| 22a | inclined surface |
| 23 | ball |
| 24 | thrust needle roller bearing |
| 25 | oblique plate |
| 26 | piston rod |
| 27 | piston |
| 28 | housing |
| 29 | thrust needle roller bearing |
| 31 | spindle |
| 32 | coupling member |
| 33 | sleeve |
| 34 | thrust needle roller bearing |
| 35 | oblique plate |
| 36 | piston rod |
| 37 | piston |
| 38 | housing |
| 39 | thrust needle roller bearing |

-continued

| | Explanation of reference numbers |
|---|---|
| 41 | piston pump |
| 42 | electric motor |
| 43 | armature |
| 44 | armature shaft |
| 44a | eccentric portion |
| 45 | pump housing |
| 45a | recess |
| 46 | ball bearings |
| 47 | piston |
| 48 | suction port |
| 49 | outlet port |

DETAILED DESCRIPTION OF PREFERRED EMBODIMENTS

Figure 1:
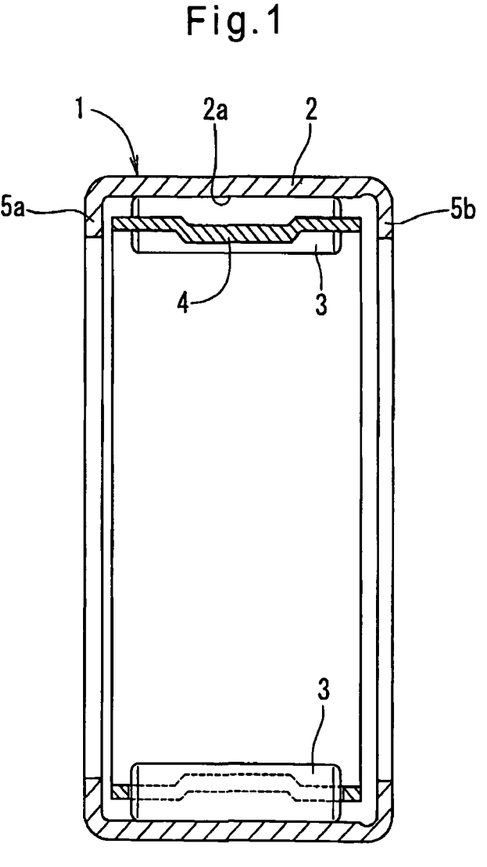
FIG. 1 is a vertical sectional view showing an embodiment of the shell type needle roller bearing.

Below, based on the drawings, an embodiment of this invention is described. As shown in FIG. 1, this shell type needle roller bearing 1 has a plurality of needle rollers 3 arranged along the inner-diameter surface 2a of a shell type outer ring 2 formed of SCM415 by pressing. The needle rollers 3 are retained by a retainer 4 formed of SPCC also by pressing. At both end portions of the outer ring 2, flanges 5a and 5b are formed.

Figure 2:
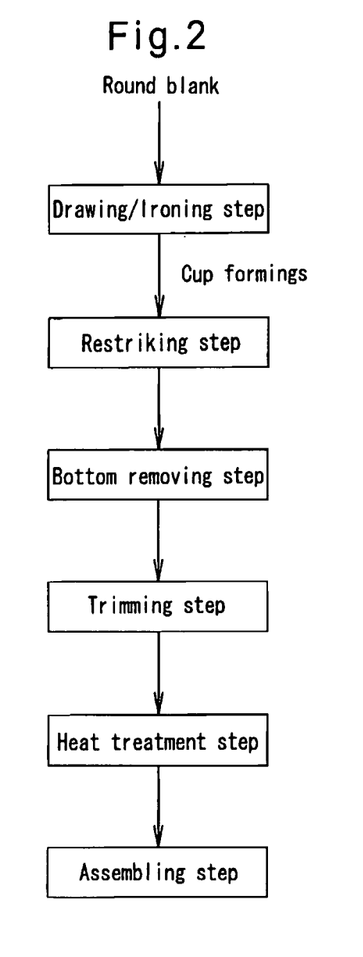
FIG. 2 is a step diagram showing schematic manufacturing steps of the shell type needle roller bearing of FIG. 1.

FIG. 2 shows schematic steps for manufacturing the shell type outer ring 2. First, by pressing, a circular blank of an SCM415 phosphate film-treated steel plate is formed into a cup-shaped article by a one-time drawing/ironing step, and the corner portion of the cup bottom is restruck to a predetermined corner radius in a restriking step. In the drawing/ironing step, a pressing oil superior in lubricity is applied to the die side so as to make the lubricating conditions on the outer-diameter ironed surface into a substantially fluid lubricating state. Next, the central portion of the cup bottom is punched in a bottom punching step to form one of the flanges 5a of the outer ring 2 (see FIG. 1), and in a trimming step, the top end portion of the cup is trimmed to a uniform height. Thereafter, the pressed outer ring 2 is subjected to carburizing hardening and tempering treatment in a heat treatment step, and in a final assembling step, the other flange 5b (FIG. 1) is formed by inward bending.

In the above-described embodiment, the drawing step in the pressing of the outer ring is only once, and the ironing step is a drawing/ironing step that is carried out simultaneously with the one-time drawing step. But the drawing steps may be a plurality of times not more than three times and the ironing step may be a drawing/ironing step carried out simultaneously with the final drawing step. The drawing step may be carried out separately after the drawing step or restriking step. Also, like the one described in JP patent publication 3073937, heat treatment may be carried out after assembling the bearing.

For the shell type outer ring 2 manufactured in the manufacturing steps of FIG. 2, the circumferential and axial surface roughnesses of the inner-diameter surface 2a were measured. The dimensions of the measured outer ring 2 were 28 mm outer diameter, 16 mm long, and 0.95 mm in wall thickness. For this measurement, using a surface roughness measuring device (SURFCOM) made by Tokyo Seimitsu Co., Ltd., the surface roughness of the inner-diameter surface 2 was measured by splitting the outer ring 1 into two semi-cylindrical portions. For the circumferential surface roughness, measurements were made at three points, i.e. positions 2 mm from both ends of the outer ring 2 and the central position in the length direction. For the axial surface roughness, the measurements were made at four points in 90° circumferential phases. As shown in FIG. 11, the surface roughness of the blank material was about Ra 0.49 μm both on the front and back, and the surface roughness of the outer-diameter surface of the cup-shaped article, which becomes the outer-diameter surface of the outer ring 2, was about Ra 0.44 μm both in the circumferential and axial directions.

Figure 3A:
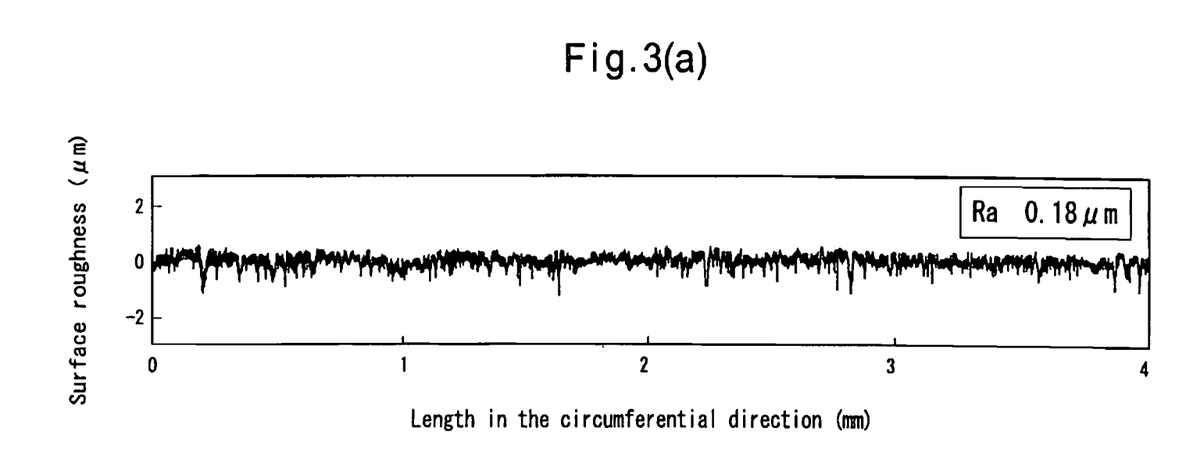
FIGS. 3(a) and 3(b) are graphs showing the circumferential and axial roughnesses of the inner-diameter surface of a shell type outer ring manufactured in the manufacturing steps of FIG. 2.
Figure 3B:
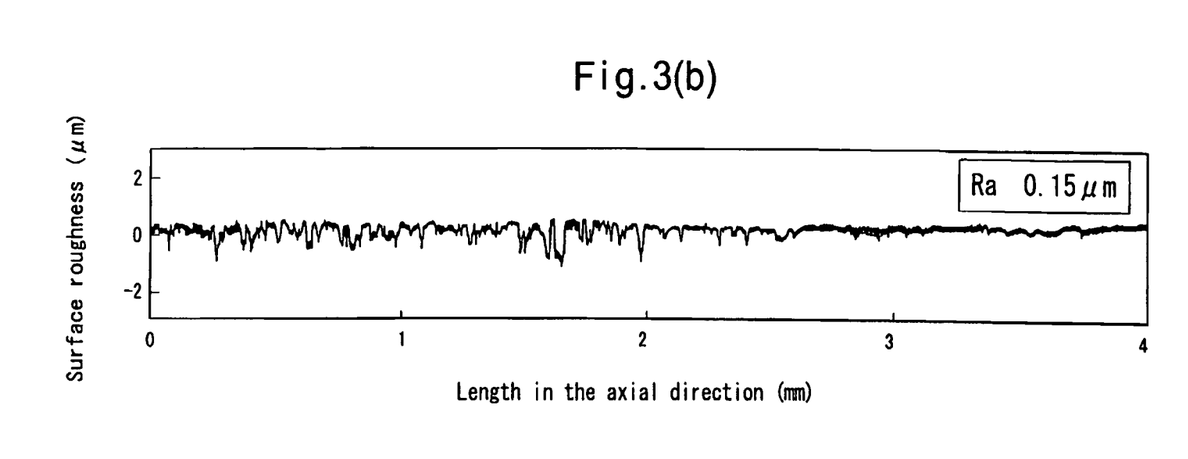

FIGS. 3(a) and 3(b) show one example of measurement results of the surface roughness. FIG. 3(a) is a circumferential surface roughness measured at the central position of the outer ring 2 in the length direction, which is extremely fine, i.e. Ra 0.18 μm. While not shown in the drawings, the circumferential surface roughness measured at positions 2 mm from both ends was in the range of Ra 0.05-0.3 μm and is finer than the surface roughness of the blank material and the outer-diameter surface. FIG. 3(b) is an axial surface roughness measured in one phase, and is Ra 0.15 μm. While not shown, the axial surface roughness measured at other phases was also extremely fine, i.e. Ra 0.3 μm or less.

Examples A

As examples, shell type needle roller bearings of which the circumferential surface roughness of the outer ring inner-diameter surface is Ra 0.05-0.3 μm were prepared. For these examples, the axial surface roughness was also Ra 0.3 μm or less. As comparative examples, shell type needle roller bearings of which the circumferential surface roughness of the outer ring inner-diameter surface exceeds Ra 0.3 μm were also prepared. The dimensions of the shell type needle roller bearings were 28 mm outer diameter and 16 mm long both for examples and comparative examples.

Each of the shell type needle roller bearings of examples and comparative examples was mounted on a rotary tester, and an acoustic measurement test was conducted. The test conditions were as follows.
Rotating speed: 4800 rpm
Radial load: 180 N
Lubrication: Viscosity 2 cSt oil was applied
Acoustic measurement position: 100 mm apart from the bearing in the 45° direction FIG. 3 shows measurement results of the acoustic level in the acoustic measurement test. From these measurement results, for examples, in which the circumferential surface roughness of the inner-diameter surface was Ra 0.05-0.3 μm, the acoustic level was 60 dB or less for any of them, so that the acoustic level has markedly decreased compared with those of comparative examples.

Examples B

Table 1 shows the results of measurements in which the inner-diameter roundness and the amount of uneven thickness of the tubular portion for shell type outer rings manufactured in the manufacturing steps of FIG. 2 (Examples 1-6), and shell type outer rings manufactured in conventional manufacturing steps (Comparative Examples 1-6) were measured. The dimensions of the outer rings were 28 mm outer diameter, 16 mm long and 0.95 mm in wall thickness, and were of the same size as those of Examples A. The axial measuring positions for the inner-diameter roundness and the amount of uneven thickness of the tubular portion were three points which were the same as the measuring positions of the circumferential surface roughness of the inner-diameter surface, and for the amount of uneven thickness of the tubular portion, the measurements were made at four points for each axial position in 90° circumferential phases, a total of 12 points. For the measurement of the inner-diameter roundness, a roundness measuring device (Talyrond) made by Taylor Hobson Ltd. was used, while for the measurement of the amount of uneven thickness of the tubular portion, a micrometer was used. For examples, the inner-diameter roundness was 10 μm or less, and the amount of uneven thickness of the tubular portion was 10 μm or less for any of them. Comparative Example 1 was manufactured by the manufacturing method described in JP patent publication 3073937.

TABLE 1

| Shell type outer ring | Inner-diameter roundness (μm) | Amount of uneven thickness of tubular portion (μm) |
|---|---|---|
| Example 1 | 9 | 3 |
| Example 2 | 8 | 4 |
| Example 3 | 10 | 3 |
| Example 4 | 9 | 5 |
| Example 5 | 8 | 7 |
| Example 6 | 10 | 9 |
| Comparative Example 1 | 12 | 11 |
| Comparative Example 2 | 18 | 18 |
| Comparative Example 3 | 19 | 14 |
| Comparative Example 4 | 20 | 17 |
| Comparative Example 5 | 22 | 15 |
| Comparative Example 6 | 23 | 19 |

For the shell type needle roller bearings of examples and comparative examples shown in Table 1, bearing life tests were conducted. The number of samples for each of the examples and comparative examples was eight, and the bearing life was evaluated in the L10 life (time during which 90% of the samples can be used without breakage). The test conditions were as follows.
Axial load: 9.81 kN
Rotating speed: 5000 rpm
Lubricating oil: spindle oil VG2

The results of the above bearing life tests are shown in FIGS. 5 and 6. FIG. 5 shows the relation between the inner-diameter roundness and the L10 life, and FIG. 6 shows the relation between the amount of uneven thickness of the tubular portion and the L10 life. For the examples, in which the inner-diameter roundness of the shell type outer ring is 10 μm or less, the L10 life exceeded 200 hours for any of them, so that the bearing life prolonged substantially. Thus, one can see that for the shell type needle roller bearing having the shell type outer ring manufactured in the manufacturing steps of FIG. 2, not only does the acoustic level decrease, but the bearing life also improves substantially.

Figure 7:
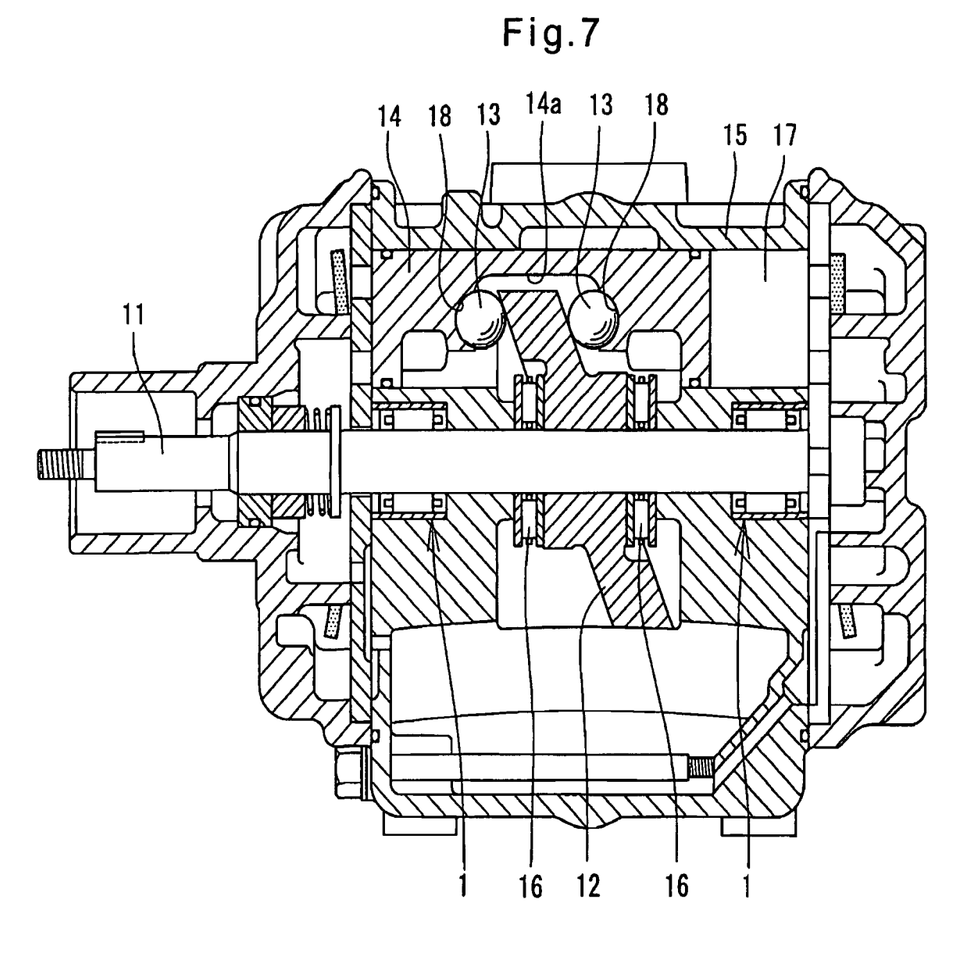
FIG. 7 is a vertical sectional view showing a compressor for an air-conditioner which employs the support structure for a compressor spindle of a first embodiment.

FIG. 7 shows a compressor for a vehicle air-conditioner that employs the support structure of a compressor spindle of the first embodiment according to the present invention. This compressor is a double oblique plate type compressor in which pistons 14, which are compression movement members, are reciprocated by the rotation of the oblique plate 12 fixed to the spindle 11 through shoes 13 that slide on the oblique plate 12. The spindle 11, which is driven at a high speed, is supported by two shell type needle roller bearings 1 according to the present invention in the radial direction and by thrust needle bearing 16 in the thrust direction in a housing 15 in which a coolant is present.

In the housing 15, a plurality of cylinder bores 17 are formed at equal intervals in the circumferential direction, with a double-headed-shaped piston 14 reciprocatively received in each bore 17. Each piston 14 is formed with a recess 14a so as to straddle the outer peripheral portion of the oblique plates 12. The spherical shoes 13 are seated on spherical seats 18 formed on the axially opposed surfaces of the recesses 14a. The shoes 13 may be semispherical ones, too, and serve to smoothly convert the rotary motion of the oblique plate 12 to reciprocating motion of the pistons 14.

Figure 8:
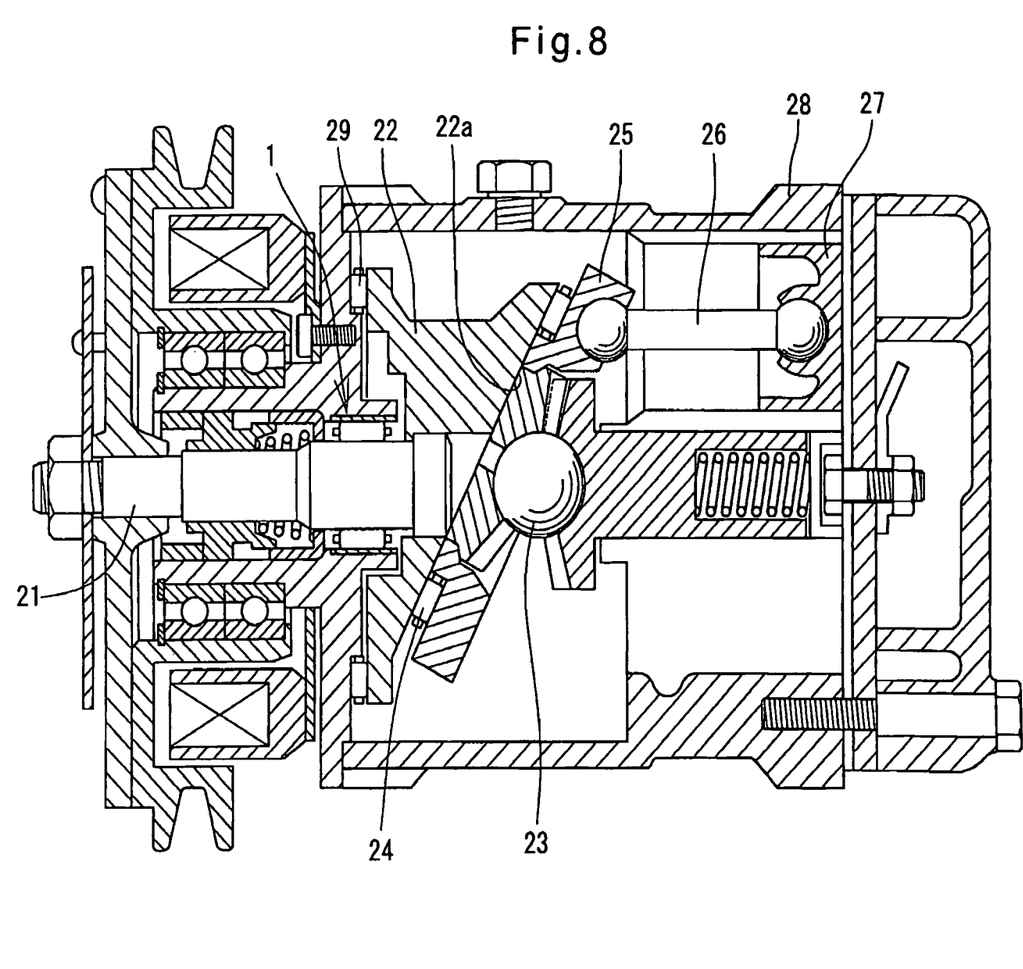
FIG. 8 is a vertical sectional view showing a compressor for an air-conditioner which employs the support structure for a compressor spindle of a second embodiment.

FIG. 8 shows a compressor for an air-conditioner which employs the support structure for a compressor spindle of the second embodiment. This compressor is a single oblique plate type compressor in which the oblique plate 25 supported by a ball 23 and a thrust needle roller bearing 24 on an inclined surface 22a of a coupling member 22 coupled to the spindle 21 is pivoted by the rotation of the coupling member 22, and the pivoting motion of the oblique plate 25 is converted to reciprocating motion of the single-headed piston 27 through the piston rod 26. The spindle 21 is supported by one shell type needle roller bearing 1 according to the present invention in the radial direction, and by a thrust needle roller bearing 29 through the coupling member 22 in the thrust direction in a housing 28.

Figure 9:
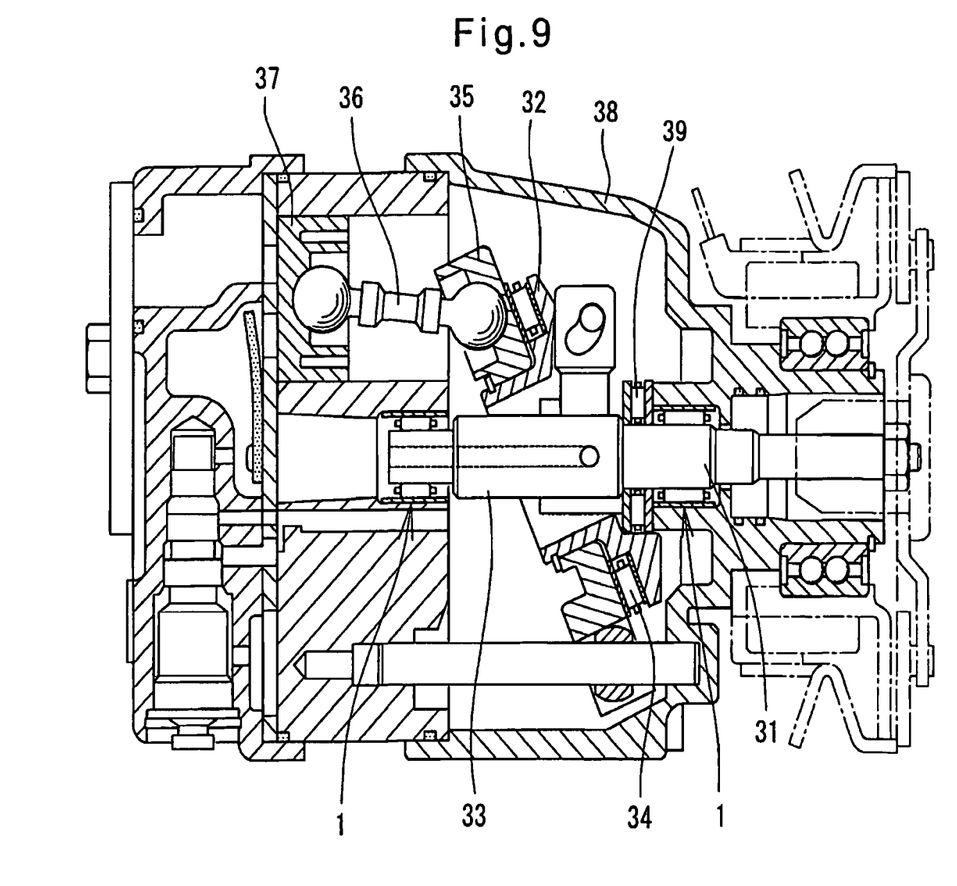
FIG. 9 is a vertical sectional view showing a compressor for an air-conditioner which employs the support structure for a compressor spindle of a third embodiment.

FIG. 9 shows a compressor for an air-conditioner which employs the support structure for a compressor spindle of the third embodiment. This compressor is a single oblique plate type, variable-capacity compressor in which the inclination angle of a coupling member 32 coupled to the spindle 31 is changeable by axially sliding a sleeve 33 fitted in the spindle 31. The pivoting motion of an oblique plate 35 supported on the coupling member 32 through a thrust needle roller bearing 34 is, as with the second embodiment, converted to the reciprocating motion of the single-headed pistons 37. This spindle 31 is supported by two shell type needle roller bearings 1 according to the present invention in the radial direction, and by a thrust needle roller bearing 39 in the thrust direction in a housing 38.

Figure 10:
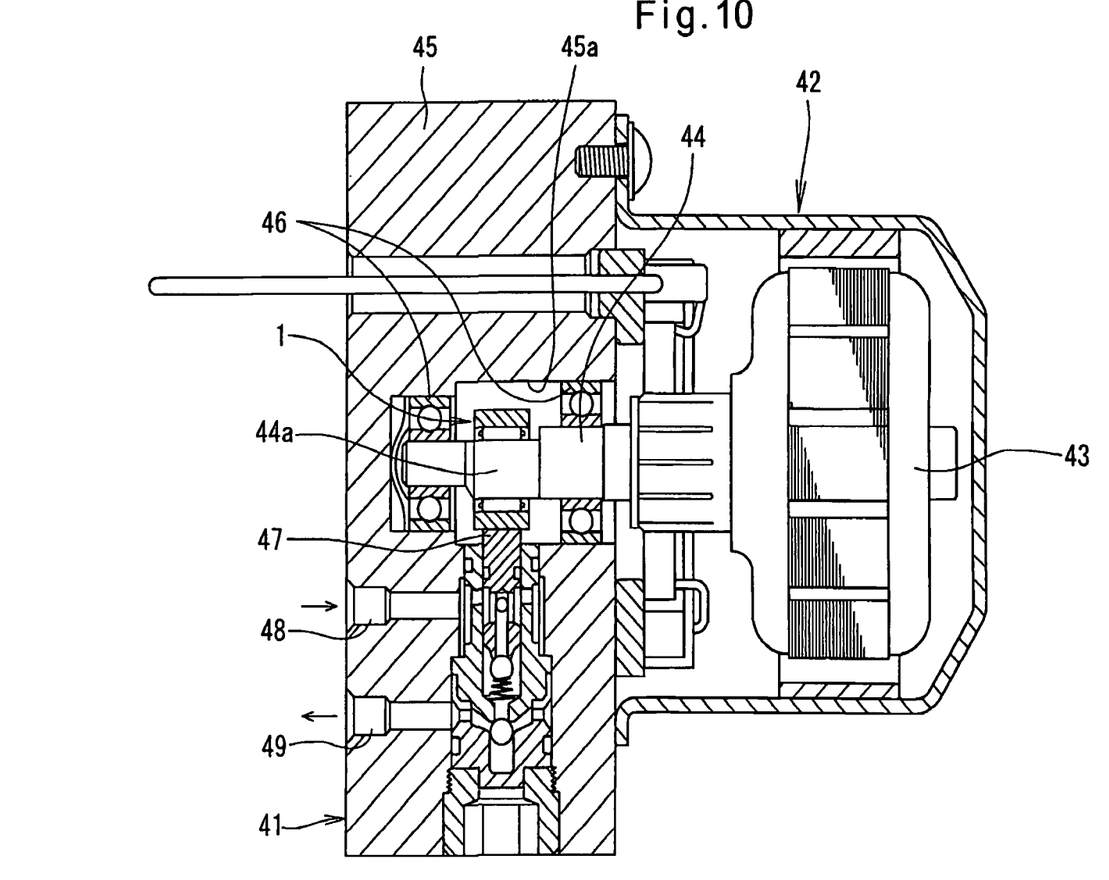
FIG. 10 is a vertical sectional view showing a piston pump for an ABS of a vehicle which employs the support structure for a piston pump driving portion according to the present invention, and an electric motor.

FIG. 10 shows a piston pump 41 for an ABS of a vehicle using the support structure of a piston pump driving portion according to the present invention, and an electric motor 42 for driving it. An armature shaft 44 of an armature 43, which is the output shaft of the electric motor 42, is supported in a recess 45a formed in a pump housing 45 so as to be perpendicular to the piston pump 41, through a pair of ball bearings 46. Pistons 47 of the piston pump 41 are abutment-supported by a shell type needle bearing 1 fitted on its eccentric portion 44a. Thus, by rotary-driving the electric motor 42, the pistons 47, which are abutment-supported by the shell type needle roller bearing 1, are reciprocated, so that brake fluid is sucked through a suction port 48 formed in the pump housing 45 and discharged through an outlet port 49. While not shown, the suction port 48 is connected to a reservoir tank, while the outlet port 49 is connected to a master cylinder.

The invention claimed is:
1. A method of manufacturing a shell type needle roller bearing, said method comprising:
    forming a shell type outer ring by pressing; and
    arranging a plurality of needle rollers along an inner-diameter surface of the shell type outer ring,
    wherein said forming of the shell type outer ring by pressing consists essentially of only one drawing operation and only one ironing operation, the only one ironing operation being carried out simultaneously with the only one drawing operation, wherein during the ironing operation,
a lubricating condition on an outer-diameter ironed surface which becomes an outer-diameter surface of the outer ring is a substantially fluid lubricating state,
a punch for ironing is kept in sliding contact with the inner-diameter surface of the shell type outer ring and
the inner-diameter surface of the outer ring is lubricated to a lesser degree than the outer-diameter surface of the outer ring such that a degree to which the inner-diameter surface of the outer ring is in contact with the punch results in the outer ring sliding relative to the punch as the outer ring moves through an ironing die, whereby a surface roughness of the inner-diameter surface of the outer ring is finer than a surface roughness of the outer-diameter surface of the outer ring as a result of the outer ring sliding relative to the punch,
and wherein the shell type outer ring is made of casehardened steel.

2. The method of claim 1, wherein a circumferential surface roughness of the inner-diameter surface of the outer ring is Ra 0.05-0.3 µm.

3. The method of claim 2, wherein an axial surface roughness of the inner-diameter surface of the outer ring is Ra 0.3 µm or less.

4. The method of claim 1, wherein an inner-diameter roundness of the outer ring is not more than 10 µm.

5. The method of claim 4, wherein the material of the shell type outer ring is a phosphate film-treated steel plate.

6. The method of claim 1, wherein an amount of uneven thickness of a tubular portion of the outer ring is less than 10 µm.

7. The method of claim 6, wherein the material of the shell type outer ring is a phosphate film-treated steel plate.

8. The method of claim 1, wherein the material of the shell type outer ring is a phosphate film-treated steel plate.

9. The method of claim 1, wherein during the ironing operation, friction at the inner-diameter surface of the shell type outer ring is greater than the friction at the outer-diameter ironed surface which becomes the outer-diameter surface of the outer ring because a degree of sliding contact between the inner-diameter surface of the outer ring and the punch is greater than a degree of sliding contact between the outer-diameter surface of the outer ring and the ironing die.

10. The method of claim 1, wherein during the ironing operation, the inner-diameter surface of the shell type outer ring moves relative to the punch in an axial direction by a distance greater than the outer-diameter ironed surface which becomes the outer-diameter surface of the outer ring is moved in the axial direction relative to the ironing die because a degree of sliding contact between the inner-diameter surface of the outer ring and the punch is greater than a degree of sliding contact between the outer-diameter surface of the outer ring and the ironing die.

11. The method of claim 1, wherein a degree of drawing and/or ironing at the inner-diameter surface of the shell type outer ring is higher than at the outer-diameter ironed surface which becomes the outer-diameter surface of the outer ring because a degree of sliding contact between the inner-diameter surface of the outer ring and the punch is greater than a degree of sliding contact between the outer-diameter surface of the outer ring and the ironing die.

* * * * *